(12) United States Patent
Matsumura et al.

(10) Patent No.: US 12,389,242 B2
(45) Date of Patent: Aug. 12, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 411 days.

(21) Appl. No.: 17/924,497

(22) PCT Filed: May 20, 2020

(86) PCT No.: PCT/JP2020/020010
§ 371 (c)(1),
(2) Date: Nov. 10, 2022

(87) PCT Pub. No.: WO2021/234878
PCT Pub. Date: Nov. 25, 2021

(65) Prior Publication Data
US 2023/0146642 A1    May 11, 2023

(51) Int. Cl.
*H04W 74/0833*    (2024.01)
*H04W 24/04*    (2009.01)

(52) U.S. Cl.
CPC ....... *H04W 24/04* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2020/0120584 A1* | 4/2020 | Yi | H04W 74/0833 |
| 2020/0204246 A1* | 6/2020 | Zhou | H04W 72/044 |
| 2020/0260300 A1* | 8/2020 | Cirik | H04B 7/0695 |
| 2023/0028423 A1* | 1/2023 | Xu | H04W 36/06 |

OTHER PUBLICATIONS

International Search Report issued in PCT/JP2020/020010 on Dec. 28, 2020 (2 pages).

(Continued)

*Primary Examiner* — Benjamin Lamont
(74) *Attorney, Agent, or Firm* — Osha Bergman Watanabe & Burton LLP

(57) ABSTRACT

A terminal according to one aspect of the present disclosure includes a transmitting section that transmits a random access preamble in a given cell when beam failure is detected, and a control section that assumes a same antenna port quasi-co-location parameter as that associated with an index of a reference signal corresponding to the random access preamble for monitoring of a downlink control channel in a given control resource set after a given period from timing at which contention resolution is successful in random access procedure corresponding to the random access preamble and until specific information related to a Transmission Configuration Indication state (TCI state) for a downlink control channel is received. According to one aspect of the present disclosure, it is possible to appropriately update a beam in relation to BFR.

4 Claims, 9 Drawing Sheets

(56) References Cited

OTHER PUBLICATIONS

Written Opinion of the International Searching Authority issued in PCT/JP2020/020010 on Dec. 28, 2020 (3 pages).
Nokia, Nokia Shanghai Bell; "Maintenance of Rel-16 Beam Management"; 3GPP TSG RAN WG1 #101, R1-2004266; e-meeting; May 25-Jun. 5, 2020 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action in Chinese Patent Application No. 202080104682.4, dated Aug. 17, 2024 (12 pages).
3GPP TSG-RAN WG2 #101Bis; Tdoc R2-1805414; Ericsson; "Beam Failure Recovery in Scell and contention-based BFR on SpCell"; Sanya, P.R. of China, Apr. 16-20, 2018 (6 pages).
Office Action issued in Japanese Patent Application No. 2022-524776, dated Apr. 2, 2024 (6 pages).
Office Action issued in counterpart Chinese Patent Application No. 202080104682.4 mailed on Mar. 21, 2025 (11 pages).

* cited by examiner

TERMINAL, RADIO COMMUNICATION METHOD, AND BASE STATION

TECHNICAL FIELD

The present disclosure relates to a terminal, a radio communication method and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (also referred to as, for example, "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, a user terminal (User Equipment (UE)) that performs a procedure for detecting beam failure (BF) and switching to another beam (which may be referred to as a beam failure recovery (BFR) procedure, BFR, and so on) is under study.

However, in existing Rel. 16 NR specifications, a case where a beam with failure is continuously used after completion of BFR is conceivable. In this case, appropriate communication is not possible, and thus throughput reduction or communication quality degradation may occur.

Thus, an object of the present disclosure is to provide a terminal, a radio communication method, and a base station that can appropriately update a beam in relation to BFR.

Solution to Problem

A terminal according to one aspect of the present disclosure includes a transmitting section that transmits a random access preamble in a given cell when beam failure is detected, and a control section that assumes a same antenna port quasi-co-location parameter as that associated with an index of a reference signal corresponding to the random access preamble for monitoring of a downlink control channel in a given control resource set after a given period from timing at which contention resolution is successful in random access procedure corresponding to the random access preamble and until specific information related to a Transmission Configuration Indication state (TCI state) for a downlink control channel is received.

Advantageous Effects of Invention

According to one aspect of the present disclosure, it is possible to appropriately update a beam in relation to BFR.

DESCRIPTION OF EMBODIMENTS (Beam Failure Recovery)

For NR, performing communication by using beam forming is under study. For example, a UE and a base station (e.g., gNodeB (gNB)) may use a beam used for signal transmission (also referred to as a transmit beam, Tx beam, and so on) and a beam used for signal reception (also referred to as a receive beam, Rx beam, and so on).

Using beam forming causes vulnerability to interference from an obstruction, and thus it is assumed that radio link quality deteriorates. Due to deterioration of the radio link quality, radio link failure (RLF) may occur frequently. Occurrence of RLF requires reconnection of a cell, and thus frequent occurrence of RLF causes deterioration of system throughput.

For NR, performing a procedure for switching to another beam (which may be referred to as beam recovery (BR), beam failure recovery (BFR), L1/L2 (Layer 1/Layer 2) beam recovery, and so on) in order to suppress occurrence of RLF when quality of a specific beam deteriorates is under study. Note that the BFR procedure may be simply referred to as BFR.

Note that beam failure (BF) of the present disclosure may be referred to as link failure or radio link failure (RLF).

Figure 1:
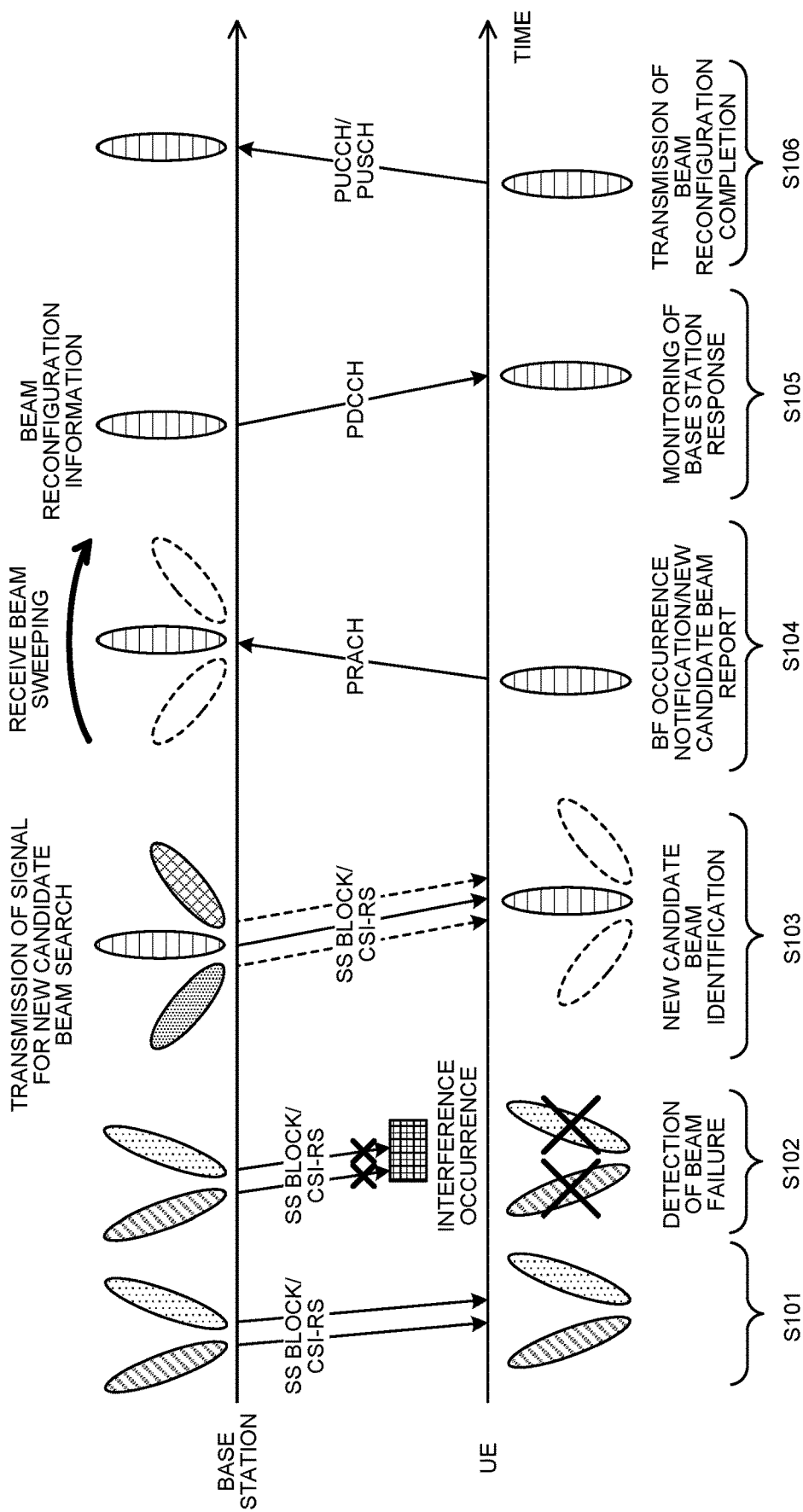
FIG. 1 is a diagram to show an example of a beam recovery procedure in Rel. 15 NR.

FIG. 1 is a diagram to show an example of the beam recovery procedure in Rel. 15 NR. The number of beams and the like are merely examples, and are not limited to this. In an initial state (step S101) of FIG. 1, the UE performs measurement based on a reference signal (RS) resource transmitted with use of two beams.

The RS may be at least one of a synchronization signal block (SSB) and an RS for channel state measurement (Channel State Information RS (CSI-RS)). Note that the SSB may be referred to as an SS/PBCH (Physical Broadcast Channel) block and so on.

The RS may be at least one of a primary synchronization signal (Primary SS (PSS)), a secondary synchronization signal (Secondary SS (SSS)), a mobility reference signal (Mobility RS (MRS)), a signal included in the SSB, the SSB, the CSI-RS, a demodulation reference signal (DMRS), a beam-specific signal, and the like, or may be a signal constituted by extending, changing, and the like these signals. The RS measured at step S101 may be referred to as an RS for beam failure detection (Beam Failure Detection RS (BFD-RS)) and so on.

At step S102, due to interference of a radio wave from the base station, the UE fails to detect the BFD-RS (or reception quality of the RS deteriorates). Such interference may occur due to, for example, influence of an obstruction, phasing, interference, and the like between the UE and the base station.

The UE detects beam failure when a given condition is satisfied. For example, the UE may detect occurrence of the beam failure when a block error rate (BLER) with respect to all of configured BFD-RSs (BFD-RS resource configurations) is less than a threshold value. When occurrence of the beam failure is detected, a lower layer (physical (PHY) layer) of the UE may notify (indicate) a higher layer (MAC layer) of a beam failure instance.

Note that judgment criteria are not limited to the BLER, and may be reference signal received power in the physical layer (Layer 1 Reference Signal Received Power (L1-RSRP)). In place of the RS measurement or in addition to the RS measurement, beam failure detection may be performed on the basis of a downlink control channel (Physical Downlink Control Channel (PDCCH)) and the like. The BFD-RS may be expected to be quasi-co-location (QCL) with a DMRS for a PDCCH monitored by the UE.

Here, QCL is an indicator indicating statistical properties of the channel. For example, when a given signal/channel and another signal/channel are in a relationship of QCL, it may be indicated that it is assumable that at least one of Doppler shift, a Doppler spread, an average delay, a delay spread, and a spatial parameter (e.g., a spatial reception filter/parameter (Spatial Rx Filter/Parameters or a spatial transmission filter/parameter (Spatial Tx (transmission) Filter/Parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element of the QCL) of the present disclosure may be interpreted as spatial QCL (sQCL).

Information related to the BFD-RS (e.g., indices, resources, numbers, the number of ports, precoding, and the like for the RS), information related to the beam failure detection (BFD) (e.g., the above-mentioned threshold value), and the like may be configured (notified) for the UE with use of higher layer signaling or the like. The information related to the BFD-RS may be referred to as information related to resources for BFR and so on.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The MAC layer of the UE may start a given timer (which may be referred to as a beam failure detection timer) when receiving beam failure instance notification from the PHY layer of the UE. The MAC layer of the UE may trigger BFR (e.g., start any one of random access procedures mentioned later) when receiving the beam failure instance notification given times (e.g., beamFailureInstanceMaxCount configured by RRC) or more until the timer expires.

When there is no notification from the UE (e.g., time without the notification exceeds given time) or when receiving a given signal (beam recovery request at step S104) from the UE, the base station may judge that the UE has detected beam failure.

At step S103, for beam recovery, the UE starts a search for a new candidate beam used for new communication. The UE may select the new candidate beam corresponding to the RS by measuring a given RS. The RS measured at step S103 may be referred to as an RS for new candidate beam identification (New Candidate Beam Identification RS (NCBI-RS)), a CBI-RS, a Candidate Beam RS (CB-RS), and so on. The NCBI-RS may be the same as the BFD-RS, or may be different from the BFD-RS. Note that the new candidate beam may be referred to as a candidate beam or a new beam.

The UE may determine a beam corresponding to an RS satisfying a given condition as the new candidate beam. For example, the UE may determine the new candidate beam on the basis of an RS with an L1-RSRP exceeding a threshold value out of configured NCBI-RSs. Note that judgment criteria are not limited to the L1-RSRP. The UE may determine the new candidate beam by using at least one of an L1-RSRP, an L1-RSRQ, and an L1-SINR (signal-to-noise interference power ratio). The L1-RSRP related to an SSB may be referred to as an SS-RSRP. The L1-RSRP related to a CSI-RS may be referred to as a CSI-RSRP. Similarly, the L1-RSRQ related to an SSB may be referred to as an SS-RSRQ. The L1-RSRQ related to a CSI-RS may be referred to as a CSI-RSRQ. Similarly, the L1-SINR related to an SSB may be referred to as an SS-SINR. The L1-SINR related to a CSI-RS may be referred to as a CSI-SINR.

Information related to the NCBI-RS (e.g., resources, numbers, the number of ports, precoding, and the like for the RS), information related to new candidate beam identification (NCBI) (e.g., the above-mentioned threshold value), and the like may be configured (notified) for the UE with use of higher layer signaling or the like. The information related to the NCBI-RS may be obtained on the basis of information related to the BFD-RS. The information related to the NCBI-RS may be referred to as information related to resources for NCBI and so on.

Note that the BFD-RS, the NCBI-RS, and the like may be interpreted as a radio link monitoring reference signal (Radio Link Monitoring RS (RLM-RS)).

At step S104, the UE that has identified the new candidate beam transmits a beam recovery request (Beam Failure Recovery reQuest (BFRQ)). The beam recovery request may be referred to as a beam recovery request signal, a beam failure recovery request signal, and so on.

For example, the BFRQ may be transmitted with use of a random access channel (Physical Random Access Channel (PRACH)). The BFRQ may include information about the new candidate beam identified at step S103. Resources for the BFRQ may be associated with the new candidate beam.

The information about the beam may be notified with use of a beam index (BI), a port index for a given reference signal, a resource index (e.g., a CSI-RS resource indicator (CRI)), an SSB resource indicator (SSBRI), or the like.

In Rel. 15 NR, CB-BFR (Contention-Based BFR) being BFR based on contention based random access (CFRA) procedure and CF-BFR (Contention-Free BFR) being BFR based on non-contention based random access procedure (CBRA) are supported. In CB-BFR and CF-BFR, the UE may transmit a preamble (also referred to as an RA preamble, a random access channel (Physical Random Access Channel (PRACH)), a RACH preamble, and so on) as the BFRQ by using PRACH resources.

Note that the CF-BFR may be referred to as CFRA BFR. The CB-BFR may be referred to as CBRA BFR.

At step S105, the base station that has detected the BFRQ transmits a response signal (which may be referred to as BFR response, gNB response, and so on) to the BFRQ from the UE. Reconfiguration information (e.g., DL-RS resource configuration information) about one or a plurality of beams may be included in the response signal.

The response signal may be transmitted in, for example, a UE-common search space of a PDCCH. The response signal may be notified with use of a PDCCH (DCI) having a cyclic redundancy check (CRC) scrambled by a UE identifier (e.g., a cell-radio network temporary identifier (Cell Radio Network Temporary Identifier (C-RNTI)). The UE may judge, on the basis of beam reconfiguration information, at least one of a transmit beam and a receive beam to be used.

The UE may monitor the response signal on the basis of at least one of a control resource set (CORESET) for BFR and a search space set for BFR. For example, the UE may detect the DCI having the CRC scrambled by the C-RNTI in a BFR search space in a separately configured CORESET.

Regarding the CB-BFR, when the UE receives the PDCCH corresponding to the C-RNTI related to the UE itself, it may be judged that contention resolution is successful.

With respect to a process at step S105, a period for the UE to monitor response from the base station (e.g., gNB) to the BFRQ may be configured. The period may be referred to as, for example, a gNB response window, a gNB window, a beam recovery request response window, a BFRQ response window, and so on. The UE may perform retransmission of the BFRQ when there is no gNB response detected in the window period.

At step S106, the UE may transmit a message indicating that beam reconfiguration for the base station has been completed. For example, the message may be transmitted by a PUCCH, or may be transmitted by a PUSCH.

At step S106, the UE may receive RRC signaling indicating a configuration of a transmission configuration indication state (TCI state) used for the PDCCH, or may receive a MAC CE indicating activation of the configuration.

Beam recovery success (BR success) may represent, for example, a case where step S106 has been reached. On the other hand, beam recovery failure (BR failure) may correspond to, for example, a case that BFRQ transmission has reached a given number of times or a case that a beam failure recovery timer (Beam-failure-recovery-Timer) has expired.

Note that numbers for these steps are just numbers for illustration, and a plurality of steps may be organized, or the order of these steps may be changed. Whether BFR is performed may be configured for the UE with use of higher layer signaling.

(CBRA)

In NR, as contention based random access (CBRA) also used for the above-mentioned CB-BFR, there are 4-step CBRA procedure defined in Rel. 15 and 2-step CBRA procedure defined in Rel. 16. The former may be referred to as 4-step RACH and so on, and the latter may be referred to as 2-step RACH and so on.

Figure 2:
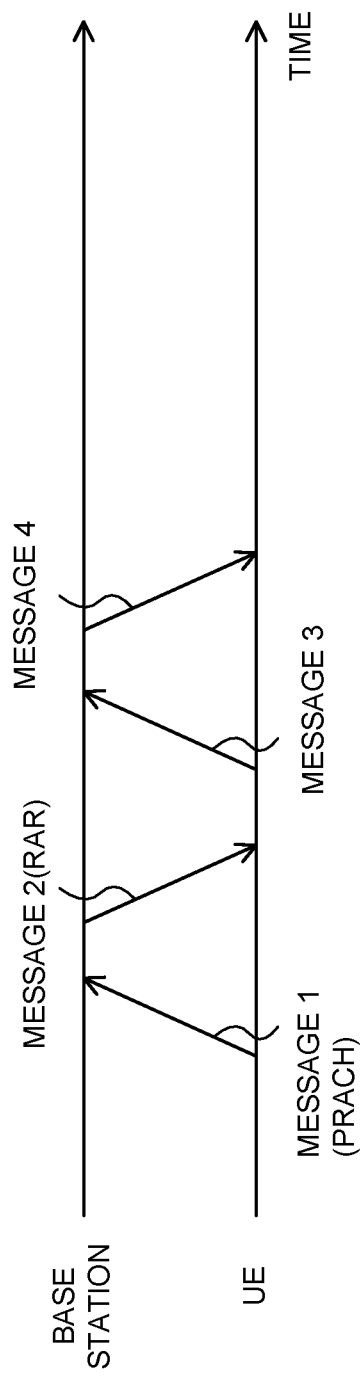
FIG. 2 is a diagram to show a flow of 4-step RACH.

FIG. 2 is a diagram to show a flow of the 4-step RACH. In the 4-step RACH, firstly, the UE transmits message 1 (random access preamble). The base station returns message 2 including response (random access response (RAR)) in response to message 1 to the UE.

Note that a DCI format to schedule the RAR has CRC scrambled by an RNTI for random access (RA-RNTI).

The UE transmits, on the basis of a UL grant indicated by the RAR, a UE identifier (ID) for contention resolution by using message 3. The UE ID may be, for example, Short (or SAE)-Temporary Mobile Subscriber Identity (S-TMSI).

When the UE is in an idle state (RRC_IDLE state) (when the UE is an idle UE), message 3 envelops a Common Control Channel Service Data Unit (CCCH SDU). The CCCH is a logical channel used in a case where RRC connections do not exist. The CCCH SDU may communicate an RRC message (e.g., an RRC connection request) including the UE ID.

When the UE is a connected UE (UE in an RRC CONNECTED state), message 3 may include a C-RNTI (MAC CE to notify the C-RNTI).

The base station returns message 4 including a contention resolution ID to the UE unless the UE ID notified by message 3 collides with another UE.

Figure 3:
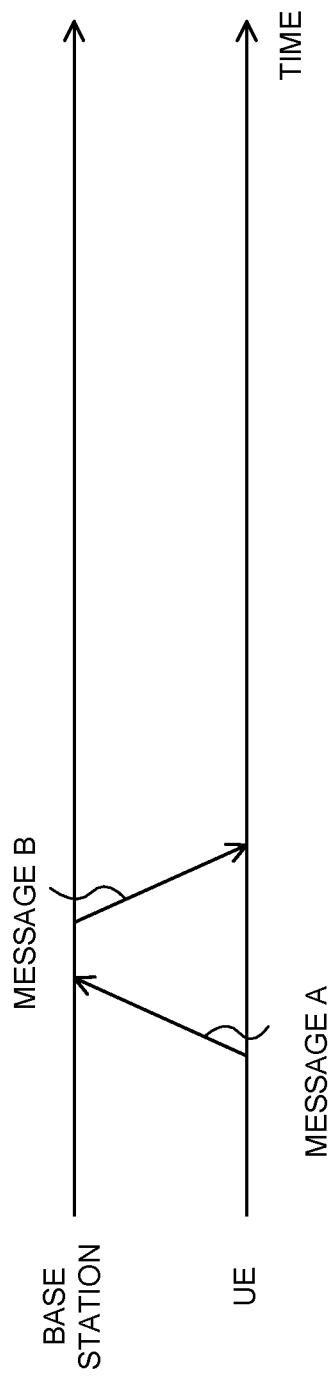
FIG. 3 is a diagram to show a flow of 2-step RACH.

FIG. 3 is a diagram to show a flow of the 2-step RACH. In the 2-step RACH, firstly, the UE transmits message A. Message A is constituted by a preamble and a PUSCH on which time division multiplexing (TDM) is performed, and corresponds to messages 1+3 of the 4-step RACH. The above-described UE ID may be transmitted on the PUSCH.

The base station returns message B to a terminal after receiving message A. Message B is constituted by a PDSCH (and a PDCCH to schedule the PDSCH), and corresponds to messages 2+4 of the 4-step RACH. Information in which the RAR and the contention resolution ID converge may be notified by message B.

Note that a DCI format to schedule message 4 or message B for the UE may have CRC scrambled by a temporary C-RNTI (TC-RNTI) when the UE is the idle UE, and may have CRC scrambled by the C-RNTI when the UE is the connected UE.

The idle UE that has received message 4 or message B may consider that CBRA is successful (contention has been resolved) when decoding of the received message succeeds and a contention resolution ID in the message are matched with that of the CCCH SDU transmitted in message 3 or message A. The UE may transmit HARQ-ACK in response to the received message. The base station that has received the HARQ-ACK may set a value of the above-described TC-RNTI for the C-RNTI of the UE.

The connected UE that has received message 4 or message B may consider that CBRA is successful (contention has been resolved) when DCI (PDCCH) that has scheduled the received message indicates the above-described C-RNTI and includes a UL grant for new transmission.

Note that in a BFR flow of FIG. 1, the BFRQ transmission of step S104 corresponds to transmission of message 1 or message A in case of CBRA BFR. The BFR response reception of step S105 also corresponds to reception of message 4 or message B (and reception of DCI to schedule these) in case of CBRA BFR.

(QCL Assumption and PUCCH Spatial Relation for PDCCH After BFR)

Rel. 16 NR specifications studied thus far (TS 38.213 V16.0.0 § 6 Link recovery procedures) includes the following descriptions with respect to an update on QCL (beam) for a PDCCH after BFR:

for PDCCH monitoring in a search space set provided by a recovery search space ID (recoverySearchSpaceId) and for corresponding PDSCH reception, a UE may assume the same antenna port quasi-co-location parameters as those associated with index $q_{new}$ until the UE receives TCI state activation or parameters for a TCI state list for the PDCCH (tci-StatesPDCCH-ToAddList, tci-StatesPDCCH-ToReleaseList, and so on) by using higher layers (For PDCCH monitoring in a search space set provided by recoverySearchSpaceId and for corresponding PDSCH reception, the UE assumes the same antenna port quasi-collocation parameters as the ones associated with index $q_{new}$ until the UE receives by higher layers an activation for a TCI state or any of the parameters tci-StatesPDCCH-ToAddList and/or tci-StatesPDCCH-ToReleaseList), and for a primary cell (PCell) or a primary secondary cell (PSCell), after 28 symbols from the last symbol of the first PDCCH reception in which the UE detects a DCI format with CRC scrambled by a C-RNTI or Modulation Coding Scheme C-RNTI (MCS-C-RNTI) in a search space set provided by a recovery search space ID (recoverySearchSpaceId), the UE may assume the same antenna port quasi-co-location parameters as those associated with index $q_{new}$ for PDCCH monitoring in a CORESET with index 0 (For the PCell or the PSCell, after 28 symbols from a last symbol of a first PDCCH reception in a search space set provided by recoverySearchSpaceId where a UE detects a DCI format with CRC scrambled by C-RNTI or MCS-C-RNTI, the UE assumes same antenna port quasi-collocation parameters as the ones associated with index $q_{new}$ for PDCCH monitoring in a CORESET with index 0).

The above-described Rel. 16 NR specifications includes the following descriptions with respect to an update on a spatial relation (beam) for a PUCCH after BFR:

for the PCell or the PSCell, after 28 symbols from the last symbol of the first PDCCH reception in which the UE detects a DCI format with CRC scrambled by a C-RNTI or MCS-C-RNTI in a search space set provided by a recovery search space ID (recoverySearchSpaceId), a UE may use the following transmission conditions until the UE receives an activation command for PUCCH spatial relation information (PUCCH-SpatialRelationInfo) or PUCCH spatial relation information (PUCCH-SpatialRelationInfo) for PUCCH resource(s) is provided for the UE when transmitting a PUCCH in the same cell as a cell in which a PRACH has been transmitted (For the PCell or the PSCell, after 28 symbols from a last symbol of a first PDCCH reception in a search space set provided by recoverySearchSpaceId for which the UE detects a DCI format with CRC scrambled by C-RNTI or MCS-C-RNTI and until the UE receives an activation command for PUCCH-SpatialRelationInfo or is provided PUCCH-SpatialRelationInfo for PUCCH resource(s), the UE transmits a PUCCH on a same cell as the PRACH transmission using):

use of the same spatial filter as that for the last PRACH transmission (a same spatial filter as for the last PRACH transmission), and transmit power determined with use of $q_u=0$, $q_d=q_{new}$, and l=0 in a mathematical expression (Subclause 7.2.1 of TS 38.213) used for determination of PUCCH transmit power (a power determined as described in Clause 7.2.1 with $q_u=0$, $q_d=q_{new}$, and l=0).

Note that $q_{new}$ may be an index for a new candidate beam (e.g., an SSB/CSI-RS) selected by the UE and reported to a network with a corresponding PRACH in the BFR procedure (or an index for a new beam discovered in the BFR procedure).

In a normal case, $q_u$ may be P0 ID for a PUCCH (p0-PUCCH-Id) indicating P0 for the PUCCH (P0-PUCCH) in P0 set for the PUCCH (p0-Set). l may be referred to as a power control adjustment state index, a PUCCH power control adjustment state index, a closed-loop index, and so on. $q_d$ may be a path loss reference RS index (configured by, for example, PUCCH-PathlossReferenceRS).

The presence of such requirements described above can avoid performing a transmitting/receiving process based on an implicit beam until an explicit beam is configured/activated for a PDCCH/PUCCH after completion of RA procedure for BFR, and allow deterioration of communication quality to be suppressed.

However, the above-described requirements assume CFRA BFR. Therefore, after completion of CFRA BFR, a beam for the PDCCH/PUCCH is not updated, a beam with failure is continuously used, and appropriate communication is not possible, and thus throughput reduction or communication quality degradation may occur.

Thus, the inventors of the present invention came up with the idea of a method for appropriately updating a beam in relation to BFR.

Hereinafter, embodiments according to the present disclosure will be described in detail with reference to the drawings. The radio communication methods according to respective embodiments may each be employed individually, or may be employed in combination.

In the present disclosure, "A/B" and "at least one of A and B" may be interchangeably interpreted.

In the present disclosure, an "index," an "ID," an "indicator," a "resource ID," and the like may be interchangeably interpreted.

(Radio Communication Method)

First Embodiment

In a first embodiment, a UE updates an assumption about a spatial relation for a PUCCH after completion of CBRA BFR.

In the first embodiment, an update on the spatial relation for the PUCCH after BFR may be performed as described below:

for a PCell or a PSCell, the UE may use the following transmission conditions after X symbols of successful contention resolution and until the UE receives an activation command for PUCCH spatial relation information or PUCCH spatial relation information for PUCCH resource(s) is provided for the UE when transmitting the PUCCH in the same cell as a cell in which a PRACH has been transmitted (For the PCell or the PSCell, after X symbols of successful contention resolution (or successful completion of contention based random access procedure for beam failure recovery), and until the UE receives an activation command for PUCCH-SpatialRelationInfo or is provided PUCCH-SpatialRelationInfo for PUCCH resource(s), the UE transmits a PUCCH on a same cell as the PRACH transmission using):

use of the same spatial filter as that for the last PRACH transmission (a same spatial filter as for the last PRACH transmission), and transmit power determined with use of $q_u=0$, $q_d=q_{newCBRA}$ (or $q_{new}$), l=0, and the like in a mathematical expression (Subclause 7.2.1 of TS 38.213) used for determination of PUCCH transmit power (a power determined as described in Clause 7.2.1 with $q_u=0$, $q_d=q_{newCBRA}$ (or $q_{new}$), l=0, and . . . ).

Note that $q_{newCBRA}$ (or $q_{new}$) may be an index for a new candidate beam (e.g., an SSB/CSI-RS) selected by the UE and reported to a network with a corresponding PRACH in CBRA BFR procedure (or an index for a new beam discovered in BFR procedure). In other words, $q_{newCBRA}$ (or $q_{new}$) may correspond to an index for an SS/PBCH block provided by a higher layer (e.g., a MAC layer).

The above-described X may be defined by specifications beforehand (e.g., X=28), may be configured by higher layer signaling or the like, or may be determined on the basis of a UE capability (e.g., a UE capability related to BFR).

Note that the above-described "after X symbols of successful contention resolution" and "after X symbols from successful completion of CBRA procedure for BFR (after X symbols of successful completion of contention based random access procedure for beam failure recovery)" may be interchangeably interpreted.

Note that "after X symbols of successful contention resolution" of the present disclosure and "after X symbols from the last symbol of the first PDCCH reception (for message 4 or message B) in which the UE detects a DCI format with CRC scrambled by a C-RNTI and that contains a UL grant for new transmission (after X symbols from a last symbol of a first PDCCH reception (of Msg. 4 or MsgB) where the UE detects a DCI format with CRC scrambled by C-RNTI and contains a UL grant for a new transmission)" may be interchangeably interpreted.

"After X symbols of successful contention resolution" of the present disclosure and "after X symbols from the last symbol of the first PDCCH reception (for message 4 or message B) in which the UE detects a DCI format with CRC scrambled by a TC-RNTI (after X symbols from a last symbol of a first PDCCH reception (of Msg. 4 or MsgB) where the UE detects a DCI format with CRC scrambled by TC-RNTI)" may be interchangeably interpreted. Here, the TC-RNTI may be interpreted as another RNTI (e.g., an RNTI for message B (MsgB-RNTI)).

"After X symbols of successful contention resolution" of the present disclosure and "after X symbols of successful contention resolution in a case where message 3 or message A of CBRA contains a BFR MAC CE (if BFR MAC CE is contained in Msg3 or MsgA of contention based random access procedure, after X symbols of successful contention resolution)" may be interchangeably interpreted. Note that these interchangeable interpretations may be applied to a second embodiment, and it is obvious that a plurality of interchangeable interpretations are performed at the same time.

In other words, in a case where message 3 or message A of CBRA contains a BFR MAC CE, the UE may update the assumption about the spatial relation for the PUCCH after completion of the CBRA. In this case, the base station can identify, on the basis of whether message 3 or message A contains the BFR MAC CE, whether these messages are for CBRA BFR or for CBRA other than that. Thus, PUCCH transmission/reception can be controlled after both of the base station and the UE acknowledge CBRA BFR completion.

Note that the BFR MAC CE of the present disclosure may be a MAC CE including information to identify a cell (e.g., a PCell, a PSCell, an SCell, and the like) in which beam failure has been detected. The MAC CE may include information about a new candidate beam (candidate RS) (e.g., an SSB index or a CSI-RS index).

"Until the UE receives an activation command for PUCCH spatial relation information or PUCCH spatial relation information for PUCCH resource(s) is provided for the UE (until the UE receives an activation command for PUCCH-SpatialRelationInfo or is provided PUCCH-SpatialRelationInfo for PUCCH resource(s))" of the present disclosure and "until the UE receives an activation command for PUCCH spatial relation information when PUCCH spatial relation information for PUCCH resource(s) is provided for the UE (until the UE receives an activation command for PUCCH-SpatialRelationInfo and if PUCCH-SpatialRelationInfo is provided for PUCCH resource(s))" may be interchangeably interpreted.

Note that when the UE receives DCI (PDCCH) for scheduling of message 4 or message B CRC-scrambled by the TC-RNTI, the UE may be assumed to be an idle UE that performs CBRA BFR, or may be assumed to be a connected UE that has transmitted a value (e.g., a random value, a new TC-RNTI, or the like) different from that of the C-RNTI in message 3 or message A. Regarding the latter, the base station may regard the connected UE as an idle UE to which the C-RNTI is not assigned, and may control generation/transmission of message 4 or message B on the basis of the above-described random value.

Figure 4:
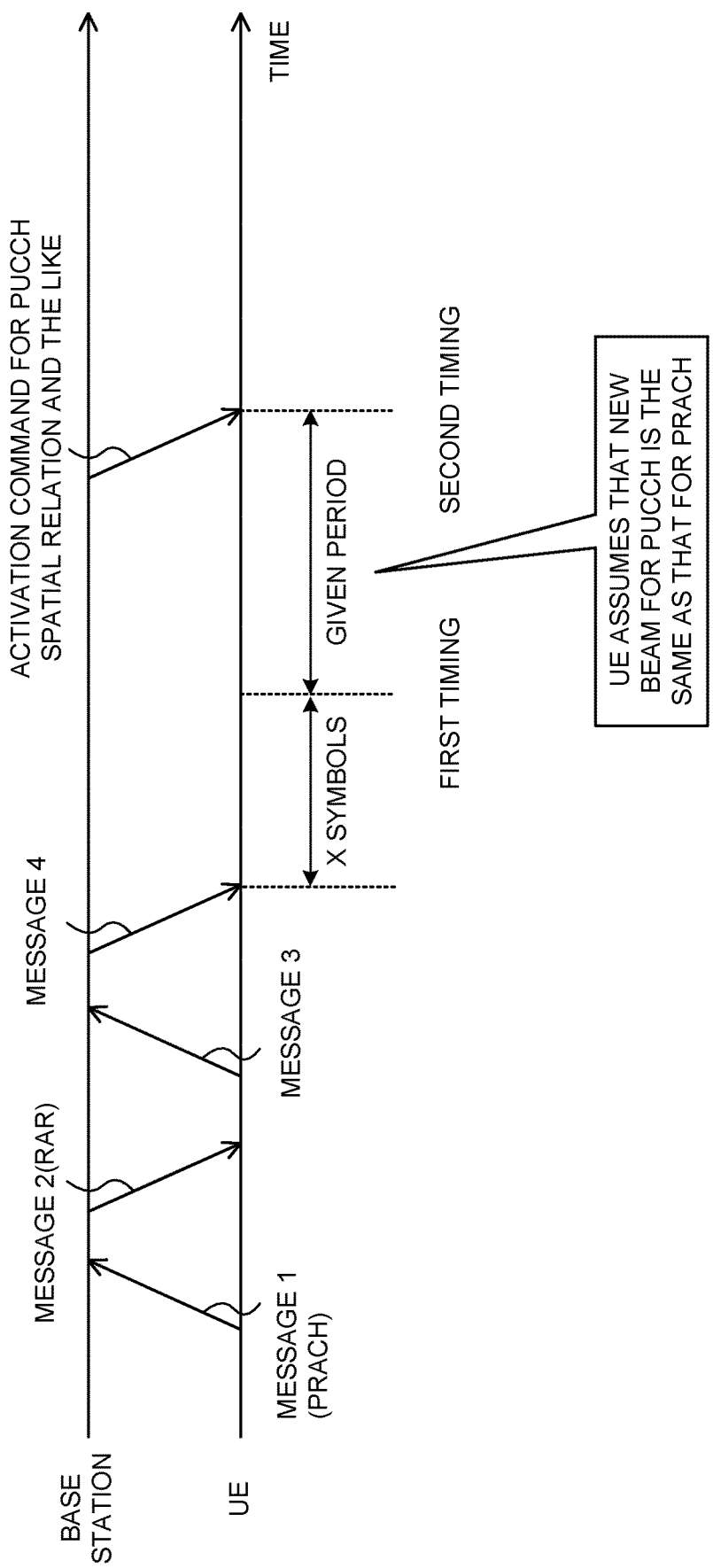
FIG. 4 is a diagram to show an example of an update on a spatial relation for a PUCCH after CBRA BFR in a first embodiment.

FIG. 4 is a diagram to show an example of an update on the spatial relation for the PUCCH after CBRA BFR in the first embodiment. In the present example, the UE assumes that a new beam for the PUCCH is the same as (a new beam for) a PRACH (the above-mentioned transmission conditions are used for transmission of the PUCCH) from a first timing until a second timing after completion of the CBRA BFR.

The first timing of FIG. 4 may be after X symbols from the last symbol of the first PDCCH reception for message 4 in which the UE detects a DCI format with CRC scrambled by the C-RNTI and containing a UL grant for new transmission.

The second timing of FIG. 4 may be timing at which an activation command for PUCCH spatial relation information is received for a cell in which the CBRA BFR has been performed.

According to the first embodiment described above, the UE can appropriately use a beam recovered by CBRA BFR for subsequent PUCCH transmission.

Second Embodiment

In a second embodiment, a UE updates a QCL assumption for a PDCCH after completion of CBRA BFR.

In the second embodiment, an update on the QCL assumption for the PDCCH after BFR may be performed as described below:

for a PCell or a PSCell, after X symbols of successful contention resolution, when the UE detects a DCI format with CRC scrambled by a C-RNTI or MCS-C-RNTI, the UE may assume the same antenna port quasi-co-location parameters as those associated with index $q_{new}$ for PDCCH monitoring in a given CORESET (and for corresponding PDSCH reception) until the UE receives TCI state activation or parameters for a TCI state list for the PDCCH (tci-StatesPDCCH-ToAddList, tci-StatesPDCCH-ToReleaseList, and so on) by using higher layers (For the PCell or the PSCell, after X symbols of successful contention resolution, when a UE detects a DCI format with CRC scrambled by C-RNTI or MCS-C-RNTI, the UE assumes the same antenna port quasi-collocation parameters as the ones associated with index $q_{new}$ for PDCCH monitoring in a CORESET (and for corresponding PDSCH reception) until the UE receives by higher layers an activation for a TCI state or any of the parameters tci-StatesPDCCH-ToAddList and/or tci-StatesPDCCH-ToReleaseList), and for the PCell or the PSCell, after X symbols of successful contention resolution, when the UE detects a DCI format with CRC scrambled by a C-RNTI or MCS-C-RNTI, the UE may assume the same antenna port quasi-co-location parameters as those associated with index $q_{new}$ for PDCCH monitoring in a CORESET with controlResourceSetZero (or CORESET with index 0) (and for corresponding PDSCH reception) (For the PCell or the PSCell, after X symbols of successful contention resolution, when a UE detects a DCI format with CRC scrambled by C-RNTI or MCS-C-RNTI, the UE assumes the same antenna port quasi-collocation parameters as the ones associated with index $q_{new}$ for PDCCH monitoring in controlResourceSetZero (or in a CORESET with index 0) (and for corresponding PDSCH reception)).

Here, the above-described "given CORESET" may be at least one of an arbitrary CORESET, all CORESETs, a specific CORESET, and a CORESET other than CORESET #0. Note that CORESET #0 may be a CORESET configured by a higher layer parameter controlResourceSetZero, or may mean a CORESET with index 0.

Note that the condition "when the UE detects a DCI format with CRC scrambled by a C-RNTI or MCS-C-RNTI," in the above-described update may be eliminated.

The above-described X may be defined by specifications beforehand (e.g., X=28), may be configured by higher layer signaling or the like, or may be determined on the basis of a UE capability (e.g., a UE capability related to BFR). X in the first embodiment and X in the second embodiment may be different values, or may be the same value.

As mentioned above, when "after X symbols of successful contention resolution" is interpreted as "after X symbols of successful contention resolution in a case where message 3 or message A of CBRA contains a BFR MAC CE," the UE may, when message 3 or message A of CBRA contains the BFR MAC CE, update the QCL assumption for the PDCCH after completion of the CBRA. In this case, the base station can identify, on the basis of whether message 3 or message A contains the BFR MAC CE, whether these messages are for CBRA BFR or for CBRA other than that. Thus, PDCCH transmission/reception can be controlled after both of the base station and the UE acknowledge CBRA BFR completion.

Figure 5:
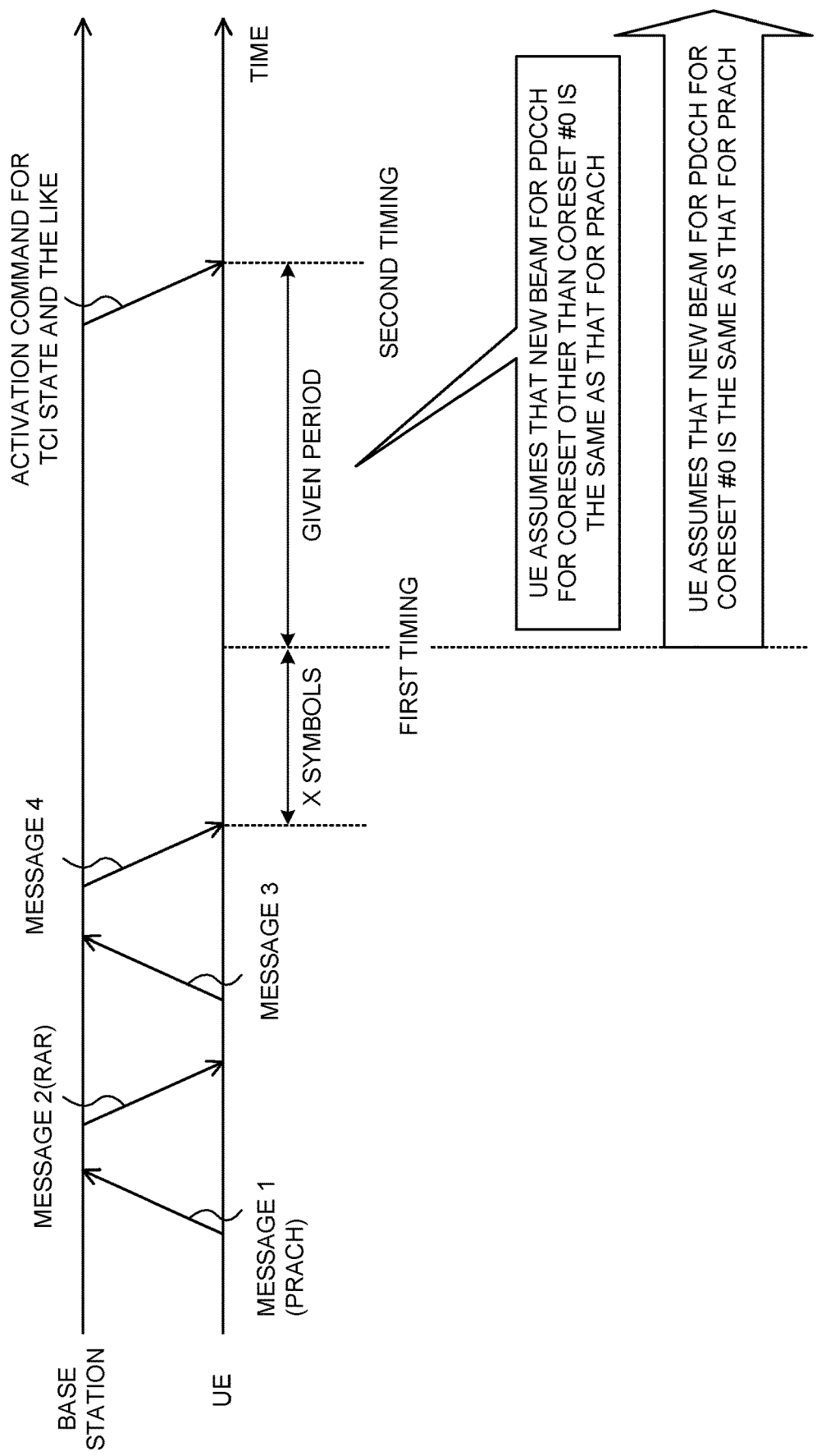
FIG. 5 is a diagram to show an example of an update on a QCL assumption for a PDCCH after CBRA BFR in a second embodiment.

FIG. 5 is a diagram to show an example of an update on the QCL assumption for the PDCCH after CBRA BFR in the second embodiment. In the present example, the UE assumes that a new beam for the PDCCH for a CORESET other than CORESET #0 is the same as (a new beam for) a PRACH (the above-mentioned QCL assumption for $q_{new}$ is applied to the PDCCH) from a first timing until a second timing after completion of the CBRA BFR.

The first timing of FIG. 5 may be after X symbols from the last symbol of the first PDCCH reception for message 4 in which the UE detects a DCI format with CRC scrambled by the C-RNTI and containing a UL grant for new transmission.

The second timing of FIG. 5 may be timing at which a TCI state activation command for the PDCCH is received for a cell in which the CBRA BFR has been performed.

In the present example, the UE also assumes that a new beam for the PDCCH for CORESET #0 is the same as (a new beam for) the PRACH (the above-mentioned QCL assumption for $q_{new}$ is applied to the PDCCH) after the first timing after completion of the CBRA BFR. In the present example, what the UE receives at the second timing is a TCI state activation command for a CORESET not being CORESET #0, and the UE may also continuously receive the PDCCH for CORESET #0 on the basis of the above-mentioned QCL assumption for $q_{new}$ after the second timing.

According to the second embodiment described above, the UE can appropriately use a beam recovered by CBRA BFR for subsequent PDCCH reception.

Other Embodiments

Note that descriptions of the above-described respective embodiments may be introduced to, in Rel. 16 NR, TS 38.213 § 6 Link recovery procedures similarly to descriptions related to BFR for a physical layer thus far, or may be described in another chapter (e.g., TS 38.213 § 8 Random access procedures). In a case of the latter, it may be clearly stated in § 6 that CBRA BFR is described in such another chapter.

Note that the above-described respective embodiments may be employed in a UE for which a specific parameter is configured by RRC. For example, the specific parameter may be a parameter to activate BFR of Rel. 16, or may be a parameter (e.g., "QCL_CBRA-BFR_r16") to configure behavior of QCL or CBRA BFR for Rel. 16.

Note that the above-described respective embodiments may be employed in a UE that has reported specific capability information to a network. The capability information may be, for example, capability related to a QCL assumption for CBRA BFR in a special cell (SpCell). The UE that has reported the capability information may employ the above-described at least one QCL assumption/spatial relation assumption when performing CBRA BFR for the SpCell.

Note that a PCell/PSCell of the present disclosure and an SpCell may be interchangeably interpreted. The SpCell may mean a cell other than the PCell/PSCell.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
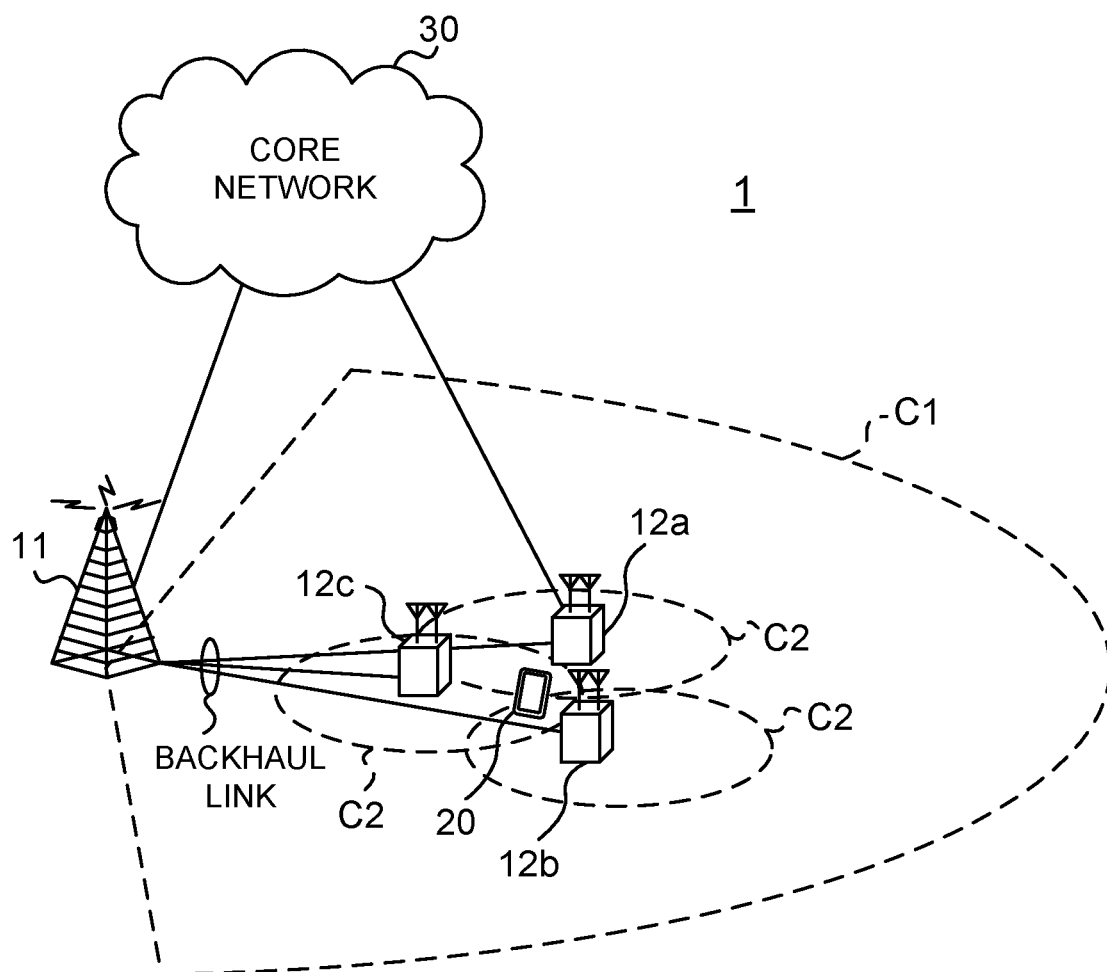
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface, and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 7:
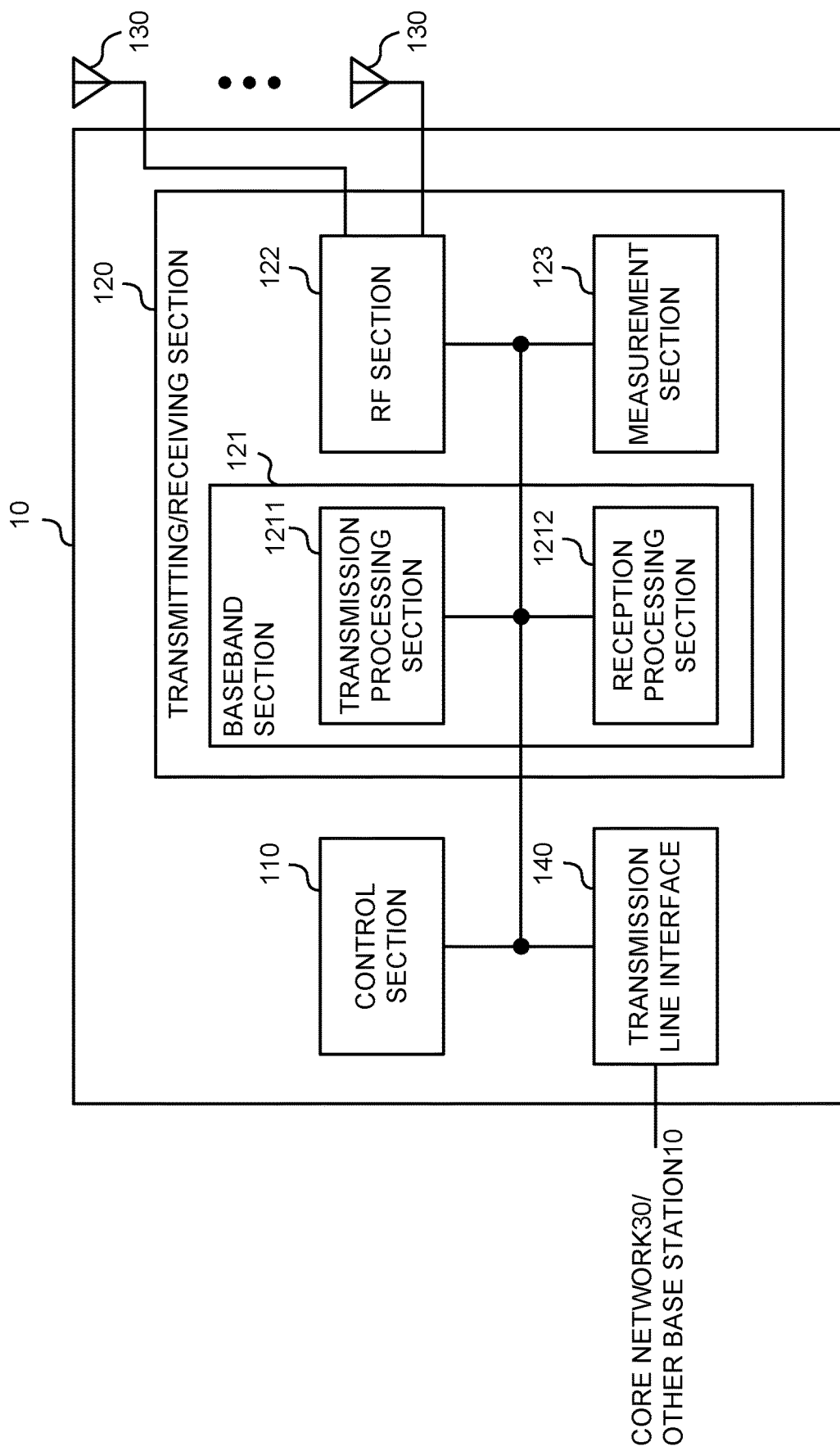
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may receive, in a given cell (e.g., an SpCell), a random access preamble (message 1 or message A) transmitted from the user terminal 20 in a case where beam failure is detected.

The control section 110 may assume that the user terminal 20 applies a same spatial filter as that for a last random access preamble transmitted in the cell to an uplink control channel (PUCCH) after a given period (e.g., X symbols) from timing at which contention resolution is successful in random access procedure (e.g., CBRA) corresponding to the random access preamble and until the user terminal 20 receives specific information related to spatial relation information about an uplink control channel.

Here, the specific information related to spatial relation information about an uplink control channel may be, for example, at least one of an activation command for PUCCH spatial relation information, a higher layer parameter (PUCCH-SpatialRelationInfo) of PUCCH spatial relation information for PUCCH resources, and the like.

The control section 110 may assume that the user terminal 20 uses a same antenna port quasi-co-location parameter as that associated with an index ($q_{new}$) of a reference signal corresponding to the random access preamble for monitoring of a downlink control channel (PDCCH) in a given control resource set (CORESET) after a given period (e.g., X symbols) from timing at which contention resolution is successful in random access procedure (e.g., CBRA) corresponding to the random access preamble and until the terminal receives specific information related to a Transmission Configuration Indication state (TCI state) for a downlink control channel.

Here, the specific information related to a TCI state for a downlink control channel may be, for example, at least one of higher layer parameters for TCI state activation or a TCI state list for a PDCCH (tci-StatesPDCCH-ToAddList for adding a TCI state to the list and tci-StatesPDCCH-ToReleaseList for deleting a TCI state from the list) and the like.

(User Terminal)

Figure 8:
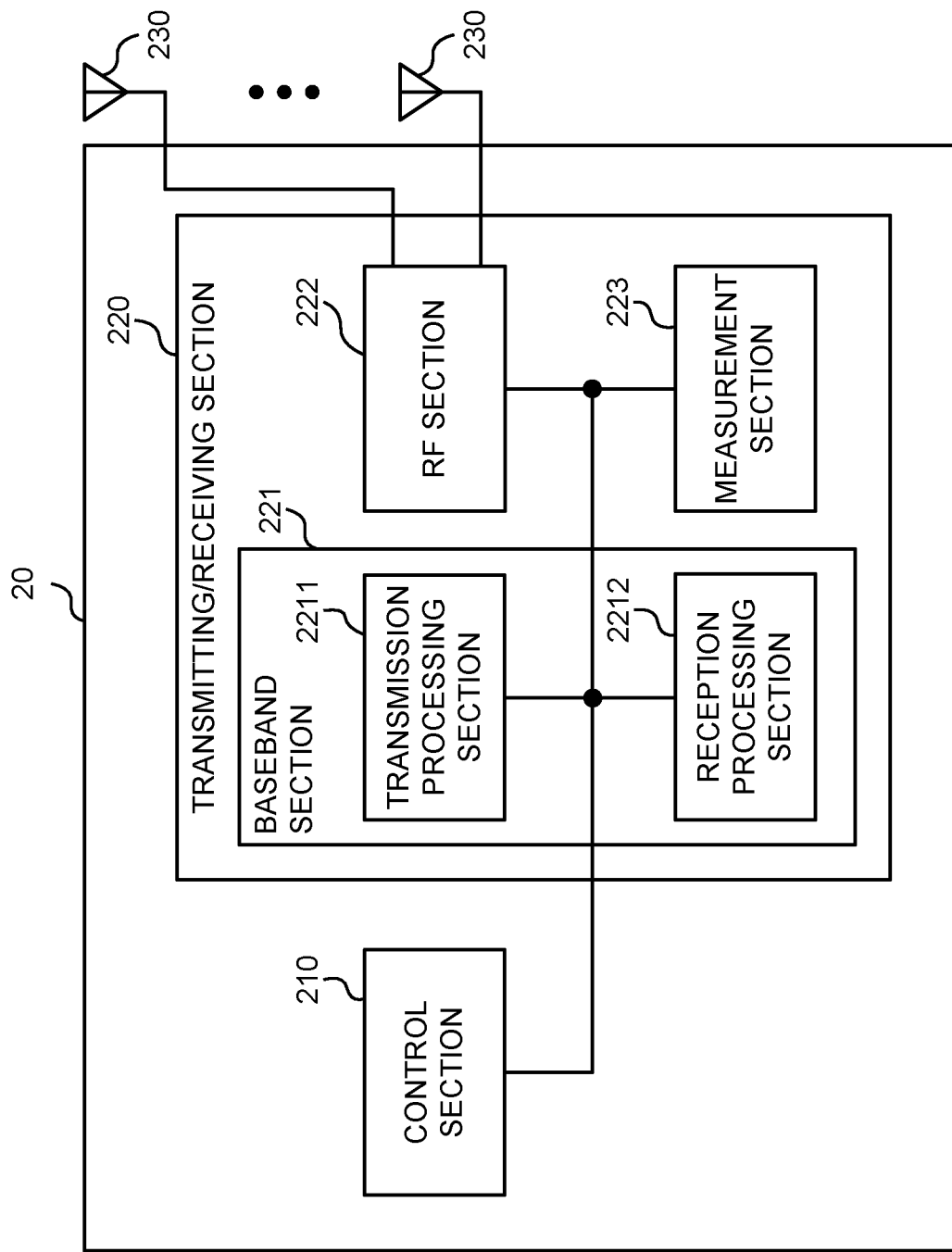
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 may, when beam failure is detected, transmit a random access preamble (message 1 or message A) in a given cell (e.g., an SpCell).

The control section 210 may apply a same spatial filter as that for a last random access preamble transmitted in the cell to an uplink control channel (PUCCH) after a given period (e.g., X symbols) from timing at which contention resolution is successful in random access procedure (e.g., CBRA) corresponding to the random access preamble and until specific information related to spatial relation information about an uplink control channel is received.

Here, the specific information related to spatial relation information about an uplink control channel may be, for example, at least one of an activation command for PUCCH spatial relation information, a higher layer parameter (PUCCH-SpatialRelationInfo) of PUCCH spatial relation information for PUCCH resources, and the like.

The control section 210 may assume that a last symbol of first downlink control channel reception (for message 4 or message B) in which a downlink control information format (DCI format) that has a cyclic redundancy check (CRC) scrambled by a cell-radio network temporary identifier (Cell Radio Network Temporary Identifier (C-RNTI)) and that contains an uplink grant (UL grant) for new transmission is detected is the timing.

The control section 210 may, when a Medium Access Control Control Element (MAC CE) for beam failure recovery (BFR MAC CE) is transmitted in the random access procedure (is transmitted, for example, by being included in message 3 or message A), apply a same spatial filter as that for a last random access preamble transmitted in the cell to an uplink control channel after the given period from the timing and until the specific information is received.

The control section 210 may assume a same antenna port quasi-co-location parameter as that associated with an index ($q_{new}$) of a reference signal corresponding to the random access preamble (PRACH) for monitoring of a downlink control channel (PDCCH) in a given control resource set (CORESET) after a given period (e.g., X symbols) from a timing at which contention resolution is successful in random access procedure (e.g., CBRA) corresponding to the random access preamble and until the terminal receives specific information related to a Transmission Configuration Indication state (TCI state) for a downlink control channel.

Here, the specific information related to a TCI state for a downlink control channel may be, for example, at least one of higher layer parameters for TCI state activation or a TCI state list for a PDCCH (tci-StatesPDCCH-ToAddList for adding a TCI state to the list and tci-StatesPDCCH-ToReleaseList for deleting a TCI state from the list) and the like.

The control section 210 may assume that a last symbol of first downlink control channel reception (for message 4 or message B) in which a downlink control information format that has a cyclic redundancy check (CRC) scrambled by a cell-radio network temporary identifier (Cell Radio Network Temporary Identifier (C-RNTI)) and that contains an uplink grant for new transmission is detected is the timing.

The control section 210 may, when a BFR MAC CE is transmitted in the random access procedure, assume a same antenna port quasi-co-location parameter as that associated with the index of the reference signal corresponding to the random access preamble for monitoring of the downlink control channel in the given control resource set after the given period from the timing and until the specific information is received.

Note that the given control resource set may be a control resource set other than control resource set #0, or may be control resource set #0.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
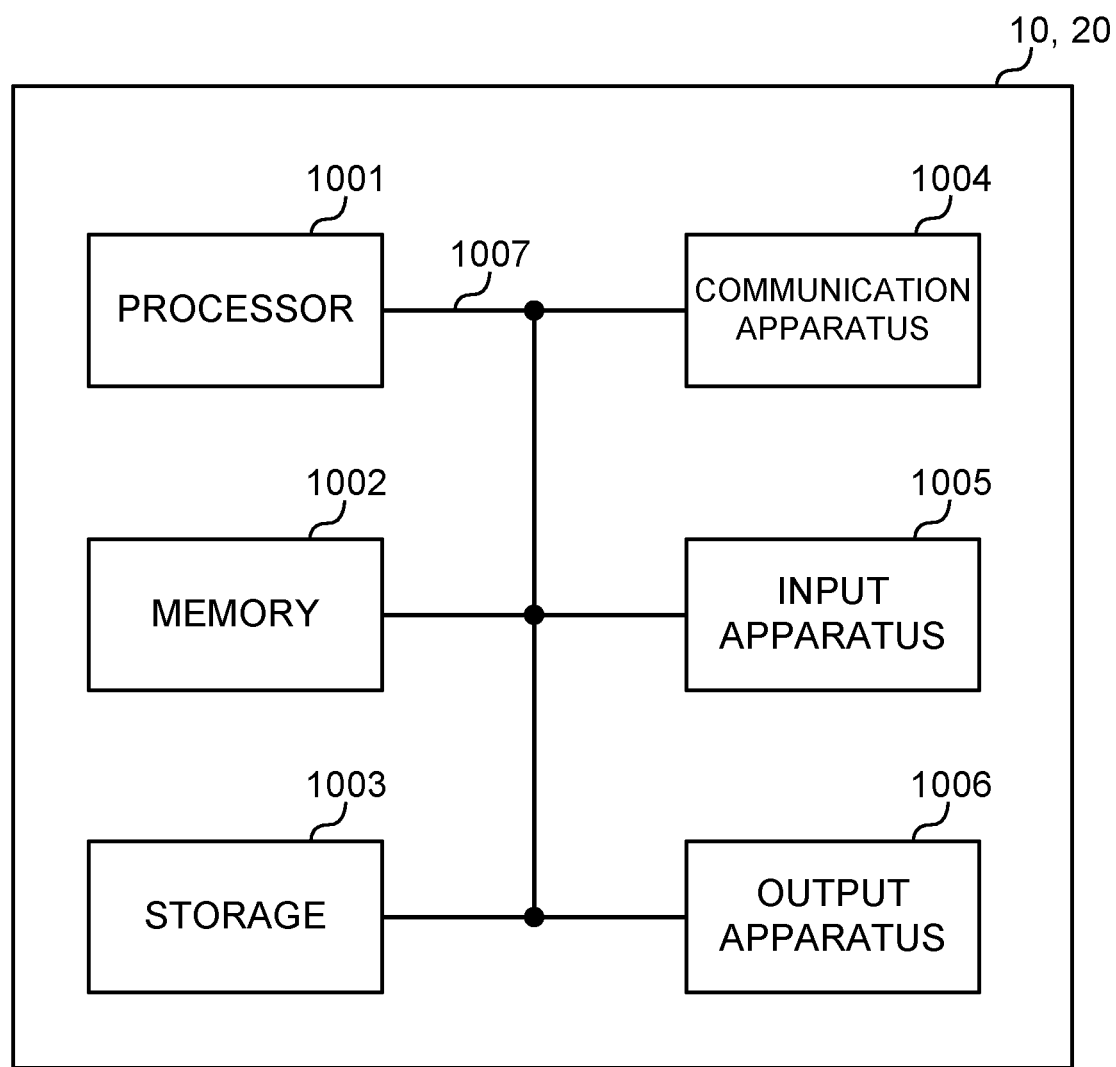
FIG. 9 is a diagram to show an example of a hardware structure of the radio base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a transmitter that transmits capability information regarding beam failure recovery (BFR) according to a contention-based random access (CBRA) procedure, and transmits a random access preamble in the BFR according to the CBRA procedure; and
a receiver that, before receiving a transmission configuration indication (TCI) state activation command, receives a physical downlink control channel (PDCCH) by using a quasi-co-location (QCL) parameter associated with an index of a synchronization signal/physical broadcast channel (SS/PBCH) block for the random access preamble in the CBRA procedure.

2. A radio communication method for a terminal, comprising:
transmitting capability information regarding beam failure recovery (BFR) according to a contention-based random access (CBRA) procedure, and transmitting a random access preamble in the BFR according to the CBRA procedure; and
before receiving a transmission configuration indication (TCI) state activation command, receiving a physical downlink control channel (PDCCH) by using a quasi-co-location (QCL) parameter associated with an index of a synchronization signal/physical broadcast channel (SS/PBCH) block for the random access preamble in the CBRA procedure.

3. A base station comprising:
a receiver that receives capability information regarding beam failure recovery (BFR) according to a contention-based random access (CBRA) procedure, and receives a random access preamble in the BFR according to the CBRA procedure; and
a transmitter that, before transmitting a transmission configuration indication (TCI) state activation command, transmits a physical downlink control channel (PDCCH) by using a quasi-co-location (QCL) parameter associated with an index of a synchronization signal/physical broadcast channel (SS/PBCH) block for the random access preamble in the CBRA procedure.

4. A system comprising a terminal and a base station, wherein
the terminal comprises:
a transmitter that transmits capability information regarding beam failure recovery (BFR) according to a contention-based random access (CBRA) procedure, and transmits a random access preamble in the BFR according to the CBRA procedure; and
a receiver that, before receiving a transmission configuration indication (TCI) state activation command, receives a physical downlink control channel (PDCCH) by using a quasi-co-location (QCL) parameter associated with an index of a synchronization signal/physical broadcast channel (SS/PBCH) block for the random access preamble in the CBRA procedure, and
the base station comprises:
a transmitter that transmits the PDCCH by using the QCL parameter associated with the index of the SS/PBCH block for the random access preamble.

* * * * *